United States Patent [19]
Betts

[11] 3,924,880
[45] Dec. 9, 1975

[54] LABORATORY COUNTER TOP AND FITTINGS THEREFOR

[75] Inventor: Paul J. Betts, Muskegon, Mich.

[73] Assignee: Inter Dyne, Spring Lake, Mich.

[22] Filed: Nov. 5, 1973

[21] Appl. No.: 412,670

[52] U.S. Cl. .................. 285/61; 108/161; 285/161
[51] Int. Cl.² .......................................... F16L 3/00
[58] Field of Search ....... 285/61, 114, 201, 64, 193, 285/159, 161, 205; 108/161; 161/193, 192; 4/187 A, 191; 85/1.5 R; 403/365, 372

[56] References Cited
UNITED STATES PATENTS

| | | | |
|---|---|---|---|
| 1,679,709 | 8/1928 | Cooper | 285/114 X |
| 2,404,904 | 7/1946 | Collins | 161/193 |
| 2,936,015 | 5/1960 | Rapata | 85/1.5 R X |
| 3,551,276 | 12/1970 | Shannon | 161/193 |

FOREIGN PATENTS OR APPLICATIONS

| | | | |
|---|---|---|---|
| 26,007 | 10/1953 | Finland | 285/193 |
| 430,175 | 6/1935 | United Kingdom | 285/193 |

*Primary Examiner*—Dave W. Arola
*Attorney, Agent, or Firm*—Price, Heneveld, Huizenga & Cooper

[57] ABSTRACT

The specification discloses a laboratory counter top of composite construction having an aperture therethrough with a spacer disposed in the aperture, extending from the top surface to the bottom surface of the counter top and being sufficiently rigid that when a fitting is mounted in the aperture and securely tightened down, the spacer is placed in compression, thereby minimizing the compressive forces on the composite counter top.

9 Claims, 4 Drawing Figures

LABORATORY COUNTER TOP AND FITTINGS THEREFOR

BACKGROUND OF THE INVENTION

The present invention relates to laboratory counter tops. Typically, laboratory counter tops are made of a single sheet of a solid, highly acid resistant, heat resistant, hard material such as marble, soap stone and resin materials such as epoxy. Laboratory counter tops must be resistant to acid and heat, resistant to rupture when objects are dropped on them, easily cleanable and low in absorbency.

Counter top materials which will meet these rigid requirements are expensive. Skyrocketing costs have forced manufacturers to try to make composite counter tops. Such composite tops might comprise a top layer of a ceramic material or other suitable laboratory top material adhered to a cheap substrate material such as chip board, plywood, fiber glass composite or the like.

In order to prevent the hard top layer material from cracking, manufacturers go to some lengths to insure that the coefficients of heat, expansion and contraction and the coefficients of moisture absorption for the top layer material and the substrate material are comparable. However, even in spite of such precautionary engineering, users of composite laboratory tops have experienced far too great a degree of top layer cracking. It is known that one top in particular, i.e., a top employing a ceramic layer and a fiber glass substrate, has experienced a degree of top layer cracking which has been crippling to the manufacturer. Teams of sophisticated engineers employed by corporate giants have not been able to solve this problem of top layer cracking in composite laboratory top structures.

SUMMARY OF THE INVENTION

The present invention comprises a laboratory counter top having an aperture therethrough with spacer means disposed in the aperture which extend from the top surface of the top to the bottom surface of the top and which is sufficiently rigid that when a fitting is passed through the aperture and tightened down, it is tightened down against the spacer whereby compressive forces on the counter top itself are minimized. While top cracking does not necessarily occur directly adjacent such top fittings, this invention surprisingly will substantially reduce all top cracking. Thus, this invention makes possible the commercial utilization of composite laboratory tops employing a top layer of a relatively thin laboratory top material and a substrate layer of a less expensive backing material.

These and other features, objects and advantages of the invention will be more fully understood and appreciated by reference to the specification and drawings.

DESCRIPTION OF THE PREFERRED EMBODIMENT

Figure 1:
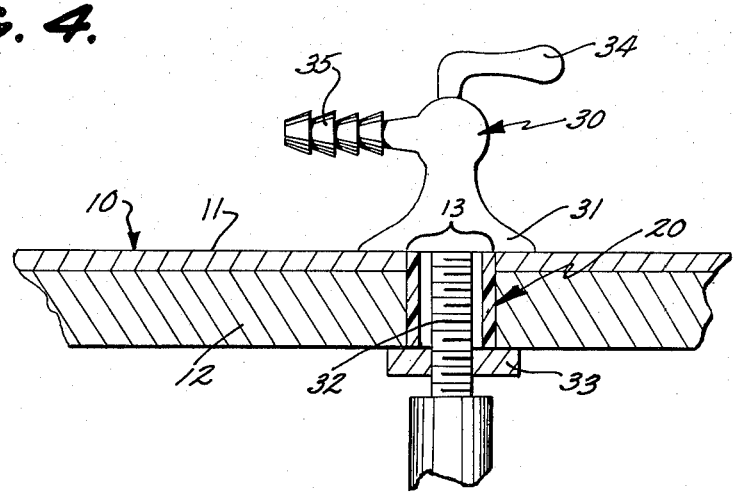
FIG. 1 is a cross-sectional view of the laboratory counter top of the present invention having a gas outlet fitting secured thereto.

In the preferred embodiment, the counter top 10 includes an aperture 13 extending therethrough and a spacer 20 mounted in aperture 13, extending from the top surface of top 10 to the bottom surface thereof and being sufficiently rigid that when gas outlet fitting 30 is mounted through aperture 13 and tightened down, spacer 20 will bear the brunt of the compressive load and minimize compressive forces on top 10 (FIG. 1).

Top 10 is composite in construction, having a top layer 11 of a material suitable for forming the top surface on a laboratory counter top. A preferred material for this purpose is ceramic in nature, such ceramic materials being well-known in the art and being commercially available from sources such as Corning Glass Works. Other suitable materials include epoxy resins, soap stone, marble and the like. Top layer 11 is preferably highly acid resistant, heat resistant, rupture resistant when objects are dropped thereon, easily cleanable and of a low absorbency.

Top layer 11 is relatively thin compared to the overall thickness of top 10 in order to minimize the overall expense of counter top 10. Top layer 11 is adhered to a substrate or backing layer 12 by means of adhesives or the like. Backing layer 12 is made of an inexpensive material having coefficients of heat and moisture expansion which are comparable to the coefficients of heat and moisture expansion of top layer material 11. When top layer 11 is made of a ceramic material, substrate 12 is preferably made of a composite fiber glass material. Other suitable substrate materials include chip board and plywood. Such materials are all less expensive than top layer material 11.

Figure 2:
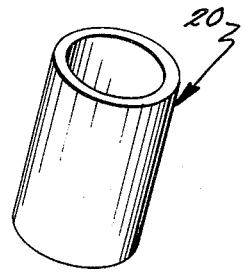
FIG. 2 is a perspective view of a preferred embodiment spacer means empolyed in the laboratory counter top of the present invention.

Spacer 20 comprises a cylindrical sleeve made of plastic (FIG. 2). Sleeve 20 is sufficiently rigid in an axial direction, from the top of counter top 10 to the bottom thereof, that as fitting 30 is tightened down, sleeve 20 takes the compressive forces in an axial direction and does not collapse to the extent of causing greater compressive forces to be placed directly on the composite materials 11 and 12 themselves. Sleeve 20 must extend from the top surface of counter top 10 through the bottom surface thereof. Spacer 20 is preferably equal in length to the thickness of top 10 so that fitting 30 fits flush with the top surface of top 10 and securing nut 33 fits flush against the bottom of top 10 whereby it will not be possible to move fitting 30 up and down as a result of spacer 20 sliding up and down within aperture 13. Such sliding movement could occur particularly where spacer 20 is held in place merely by force fit, but could also occur where spacer 20 was originally adhesively held in place, but the adhesive came loose. Yet, because spacer 20 is at least equal in length to the thickness of top 10, fitting 30 seats primarily on spacer 20 and places it in compression. In this regard, it is also preferable that spacer 20 be more rigid and less compressible in an axial direction than top 10 is from top to bottom.

In the alternative, spacer 20 could be longer than top 10 is thick. It could be securely held in place in aperture 13 by means of adhesive and extend below the level of the bottom of top 10 a short distance to further insure that minimal or no compressive forces are place on top layers 11 and 12 themselves.

Preferably, sleeve 20 comprises an extruded plastic material cut to suitable lengths. Suitable plastics include polyethylene, polypropylene, polyvinyl chloride and ABS. Metal could be used as an alternative material.

Preferably, sleeve 20 has an outer diameter such that it just snugly fits within aperture 13 in laboratory counter top 10 (FIG. 1). In this way, sleeve 20 can be inserted into aperture 13 and will be held in place by reason of a snug friction fit. For insurance, however, a small amount of adhesive can be placed on the exterior of spacer sleeve 20 or on the interior surface of aperture 13 so that each spacer sleeve 20 is positively held in place within each aperture 13.

The apertures 13 themselves are located at those points at which hardware fixtures or fittings are to be placed. A gas outlet fitting 30 is shown herein for purposes of illustration. Such a fitting 30 includes a shoulder 31 which bears against the top of counter top 10, a downwardly extending supply tube 32 which is threaded, and a securing nut 33 which is threadably carried on supply tube 32. Supply tube 32 extends through aperture 13 and shoulder 31 rests on the top of spacer 20 while securing nut 33 is threaded upwardly tightly against the bottom of spacer sleeve 20. In this manner, fitting 30 is securely held in place with spacer 20 placed in compression with compressive forces on top materials 11 and 12 themselves being minimized. Other features of gas outlet fitting 30 are conventional and include, for example, a handle 34 and an outlet nozzle 35.

Figure 3:
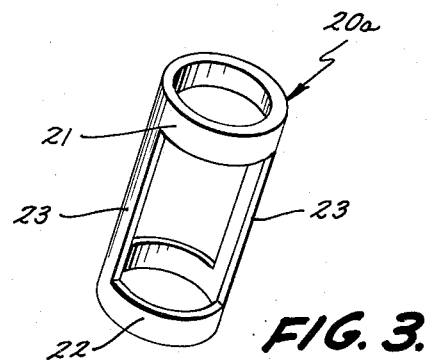
FIG. 3 is a perspective view of an alternative embodiment spacer means employed in the laboratory counter top of the present invention.

FIG. 3 discloses an alternative embodiment generally cylindrical spacer 20a having a top annular ring 21 joined to a bottom annular ring 22 by means of a pair of oppositely disposed spacer struts 23. This construction minimizes the material employed to construct the spacer and would be particularly useful where the spacer is molded, as for example by injection molding. The materials suitable for the first embodiment spacer 20 will also be suitable for making the alternative embodiment spacer 20a. In all other respects, spacer 20a is comparable to spacer 20.

Figure 4:
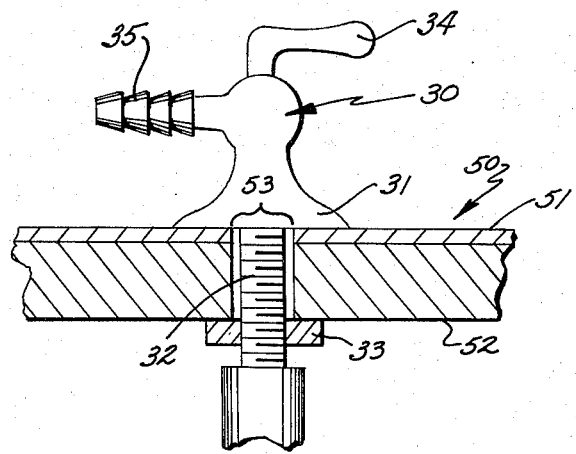
FIG. 4 is a comparable cross-sectional view of a prior art laboratory counter top having a gas outlet fitting secured thereto.

FIG. 4 shows a cross-sectional view of a prior art counter top 50 having a top layer 51 adhered to a substrate layer 52. Gas fitting 30 is mounted thereto through an aperture 53 which extends through top 50. Because of the absence of spacer 20, all of the compressive forces resulting from tightening nut 33 against the bottom of top 50 are experienced by top 50 itself.

As a result of the present invention, far more satisfactory composite laboratory tops can be commercially produced. The problems of top layer cracking, as experienced for example with ceramic top layer materials, is substantially eliminated by the present invention. Of course, it will be understood that the above is merely a preferred embodiment of the invention and that various changes and alterations can be made without departing from the spirit and broader aspects of the invention as set forth in the appended claims.

The embodiments of the invention in which an exclusive property or privilege is claimed are defined as follows:

1. A laboratory counter top for use with hardware fittings having a shoulder and a securing means spaced from the shoulder whereby the fitting can be secured in an aperture through said top with said shoulder on one side of the top and said securing means on the other side of the top, said laboratory counter top comprising: a composite top including a top layer of a material providing a suitable surface for laboratory use and a substrate layer of a less expensive backing material, said top layer being thin relative to the overall thickness of said counter top; an aperture through said composite top; generally cylindrical spacer means in said aperture, said spacer means having peripheral dimensions throughout its entire length approximately equal to those of said aperture and said spacer means extending from the top surface of said top to the bottom surface of said top and having greater rigidity in an axial direction, extending from the top to the bottom of said counter top, than does said counter top between its said top and bottom surfaces, whereby a fitting inserted through said aperture can be tightened down against said spacer means, thereby minimizing compressive forces on said laboratory counter top.

2. The laboratory counter top of claim 1 in which said spacer means has a length which is approximately equal to the thickness of said counter top.

3. The laboratory counter top of claim 1 in which said spacer means has a length which is slightly greater than the thickness of said counter top.

4. The laboratory counter top of claim 1 in which said spacer means comprises a sleeve.

5. The laboratory counter top of claim 4 in which said sleeve is made of a plastic material.

6. The laboratory counter top of claim 4 in which said sleeve has an outer diameter approximately equal to the diameter of said aperture and a length approximately equal to the thickness of said top.

7. The laboratory counter top of claim 1 in which said spacer means comprises spaced top and bottom annular rings joined by rigid strap means.

8. The laboratory counter top of claim 1 including a fitting having a shoulder, a supply tube extending downwardly from said shoulder to said aperture and fastening means spaced from said shoulder along said supply tube; said shoulder resting against said spacer means at the top surface of said counter top and said fastening means being tightened against said spacer means on the bottom surface of said counter top whereby said spacer means is placed in compression by said fitting, thereby decreasing the compressive forces on said counter top.

9. The laboratory counter top of claim 1 in which said top layer comprises a ceramic material and said substrate layer comprises a fiber glass material.

* * * * *